United States Patent
Lehtonen et al.

(10) Patent No.: US 7,324,643 B2
(45) Date of Patent: Jan. 29, 2008

(54) INVISIBLE DOUBLE FUNCTION HINGE CONSTRUCTION

(75) Inventors: Jarmo Lehtonen, Littoinen (FI); Jari Mäkinen, Salo (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 868 days.

(21) Appl. No.: 10/795,208

(22) Filed: Mar. 4, 2004

(65) Prior Publication Data

US 2005/0195970 A1    Sep. 8, 2005

(51) Int. Cl.
*H04M 9/00*    (2006.01)

(52) U.S. Cl. ............ 379/433.13; 379/433.07; 379/433.11

(58) Field of Classification Search ........... 379/428.01, 379/433.01, 433.02, 433.04, 433.06, 433.07, 379/433.11–433.13; 455/90.3, 575.1, 575.3, 455/575.4

See application file for complete search history.

(56) References Cited

U.S. PATENT DOCUMENTS

| | | | | |
|---|---|---|---|---|
| 6,487,396 | B1 * | 11/2002 | Sassi | 455/90.1 |
| 6,731,753 | B2 * | 5/2004 | Park et al. | 379/433.07 |
| 7,085,596 | B2 * | 8/2006 | Yu et al. | 455/575.1 |
| 7,203,533 | B1 * | 4/2007 | Tischer | 455/575.8 |

\* cited by examiner

*Primary Examiner*—Curtis Kuntz
*Assistant Examiner*—Tuan Duc Nguyen
(74) *Attorney, Agent, or Firm*—Foley & Lardner LLP

(57) ABSTRACT

An electronic device comprises a body. An at least partly covering lid is rotatably mounted to the body by a hinge slideably mounted to the body. The lid is rotatable to an open position, in which open position the lid reveals a key-pad of the electronic device positioned in a front side of the electronic device, above a display. The hinge is resiliently mounted to the body, so that the lid is rotatable to a closed position, in which closed position the hinge retreats to be generally invisible by the covering lid.

31 Claims, 5 Drawing Sheets

INVISIBLE DOUBLE FUNCTION HINGE CONSTRUCTION

TECHNICAL FIELD OF THE INVENTION

The present invention relates to an electronic device. In particular, the invention relates to a hinge and a lid construction thereof.

BACKGROUND OF THE INVENTION

Portable electronic devices, including but not being limited to mobile phones, personal digital assistants (PDAs), remote controllers, game consoles, portable radios and the like, have become more and more common, even a part of people's daily life. These devices assist in organizing people's life. Some of these devices provide communication with other people.

While the technical and functional requirements of these devices have developed, interfaces of these devices has developed as well. In some devices the body of the device has been covered by a covering lid. The lid, pivoted by the cover hinge, can be rotationally moved relatively to the device body. Sometimes the covering lid has acted as a functional part of the body having, for example, a loudspeaker or a microphone.

In yet some known devices, the lid has been coupled to the body by the hinge. The lid has acted as a kind of first body or the like. The first body has a display when the device is opened, and the second body has a keypad. When closed the hinge has simply folded the two bodies together thereby covering the device. However, the hinge has always been observable thereby making the device less elegant.

Furthermore, the design and structure of the known hinging and covering constructions have actually been quite clumsy, if not to say simple.

There is a need to find clever ways to handle electronic devices while meeting the ergonomics and relatively attractive appearance of the device. The electronic devices can have mechanical requirements like opening-closing function(s). Thus, the devices face mechanical and functional challenges while trying to achieve mass production with reasonable quality in the consumer market.

SUMMARY OF THE INVENTION

Now a less visible and more dimensionally enabling hinge construction has been invented for an electronic device, such as a mobile telecommunications device or some other device such as referred to above.

In accordance with aspects of the invention, there is provided an electronic device and a hinge therein, the electronic device comprising a body, an at least partly covering lid rotatably mounted to the body by a hinge, wherein the hinge is adapted to be slideably mounted to the body such that the lid is rotatable to an open position, in which open position the lid comprises a keypad of the electronic device positioned in a front side of the electronic device above a display of the electronic device, and further the hinge is resiliently mounted to the body such that the lid is rotatable to a closed position, in which closed position the hinge is adapted to retreat to be generally invisible by the covering lid.

Further embodiments of the invention provide hinge movements like rotation of 180 degrees and a slide with double movement or multidimensional movement. The resilient hinge mounting comprises a spring. The hinge mounting may comprise a telescopic construction.

In accordance with another aspect of the invention, there is provided a method for switching a functional mode of an electronic device, the method comprising the steps of:

triggering a messaging mode of the electronic device by opening a covering lid of the electronic device in such a way that a keypad for typing, which is contained in the covering lid, is positioned above a display of the electronic device, and triggering a voice communication mode of the electronic device by closing the covering lid in such a way a slidable hinge construction, which pivots the covering lid to the electronic device, is invisible, wherein triggering respective modes terminates the current mode.

Further embodiments of the invention provide hinge construction mechanisms that can provide double function movement while taking account the visual aspects also. The hinge construction allows the rotational or pivotal movement of the lid. The hinge construction allows the hinge mounting to resiliently slide the actual hinge pivot further off from the body of the electronic device. Further embodiments have a benefit that the hinge can be generally invisible to the user of the device when the covering lid is in closed position. Thereby the generally invisible hinge construction can integrate the covering lid to the front side panel of the electronic device. The integrating provides benefits of appearance, easy handling, smaller and more compact size and structure of the electronic device, etc. Furthermore, the hinge construction and design can combine both an idea of visually integrating the lid into the cover in the closed position and that when the lid is in general in an open position, the lid can act as a full qwerty keypad or the like. Furthermore, a benefit of further embodiments can also be that the design and appearance is quite smooth in the closed position thereby being convenient to the user's eye and his pocket or hand. Yet furthermore, further embodiments of the invention fit for the mass production which certainly is beneficial.

Further embodiments of the invention comprise at least two operational or functional modes depending on the positioning of the covering lid. When the lid is in a generally closed position, the electronic device can be used for voice communication. Thus, the device can be a voice communication device. When the lid is in a generally closed position, only certain keys are visible or available for use. For example, only so-called soft keys are available for dialling. Furthermore, the display is not fully available. Only a small indicator display, which comprises a part of the entire display, is visible. However, the smaller display portion and certain keys enable the user to completely use the device at least for voice communication purposes. Also some simple typing functions of the communication device such as dialling can be available. A second operational mode is activated when the lid is opened. The second mode comprises a more messaging/typing based mode. Thus, a messaging mode (also referred to as a typing mode) can be possible when the lid is open. The bigger screen is available in the second mode. Furthermore, the entire qwerty keypad or the like is available for typing. The qwerty keypad or the like is placed on the top of the entire display. The covering lid of the electronic device has the keypad on the non-covering side. The keypad is thus positioned above the display. Thus, the further embodiments of the invention provide an advantageous way to type text. For example, a thumb or both thumbs can be used to enter the text while holding the electronic device.

A mechanical construction of the further embodiments enable two different visual functionality modes for the electronic device. Therefore, by the hinge solution (slide-rotate), two mechanical and parallel functions and positions are possible.

For better understanding of the present invention reference is made to the following description, taken in conjunction with the accompanying drawings.

BRIEF DESCRIPTION OF THE DRAWINGS

The invention will now be described, by way of examples only, with reference to the accompanying drawings, in which.

DETAILED DESCRIPTION OF THE EMBODIMENTS

Figure 1:
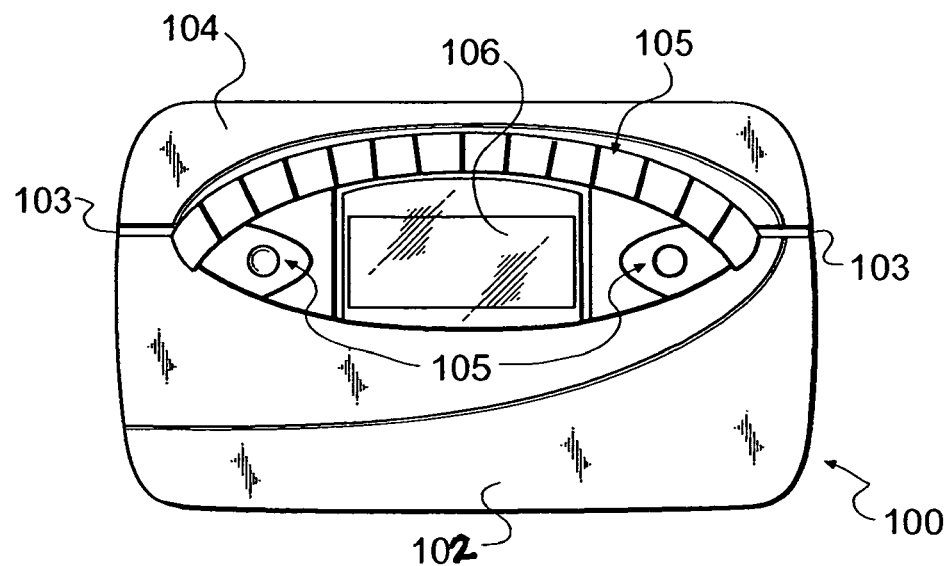
FIG. 1 depicts an example of a front view of an electronic device where a covering lid is in a closed position in accordance with some embodiments of the invention.

FIG. 1 depicts an example of a front view of an electronic device (100) in accordance with some embodiments of the invention. The electronic device (100) comprises a body (not particularly shown in FIG. 1). A covering lid (102) is shown. The covering lid (102) is in a closed position. In further embodiments, in the closed position the covering lid (102) can be advantageously integrated to the front side of the electronic device. The covering lid (102) is coupled to the body by a hinge construction (103). The hinge construction can also be referred to as a hinge (103). The hinge (103) is only shown by a joint or "a line" in the FIG. 1 because the hinge (103) or the hinge construction can be generally invisible to the user when the covering lid (102) is in the closed position. A portion (104) of the body is shown on the front view/side. The portion (104) of the body is positioned on the front side in such a way that the opening of the covering lid (102) causes a part of the lid (102) and the hinge (103) to rise/slide when the lid (102) rotates upon the portion (104). In the example of FIG. 1, the portion (104) and the lid (102) establish a general plane in the closed position. Thus, the lid (102) can be considered integrated into the body (101) of the electronic device (100) in the closed position. The portion (104) and the lid (102) accommodate certain keys (105) of the electronic device (100). The certain keys (105) as such enable, for example, voice communication capabilities of the electronic device (100). For example, dialling. Also a part or portion of a display (106) is delimited and accommodated by the lid and, thus, visible on the front side. In other words, only a part of the entire display (106) is visible in the closed position. This is done by having an opening in the lid that delimits (sets boundaries around) or exposes the part of the display for viewing with the lid closed. Thereby, a phone number or a menu etc. can be shown to the user.

In further embodiments, the covering lid (102), pivoted by the hinge (103), can be rotationally and also partly slidably and/or liftably, by the hinge (103) and the portion (104), moved to the open position. Also the user of the electronic device (100) may lift/slide the hinge when opening the covering lid (102).

Figure 2:
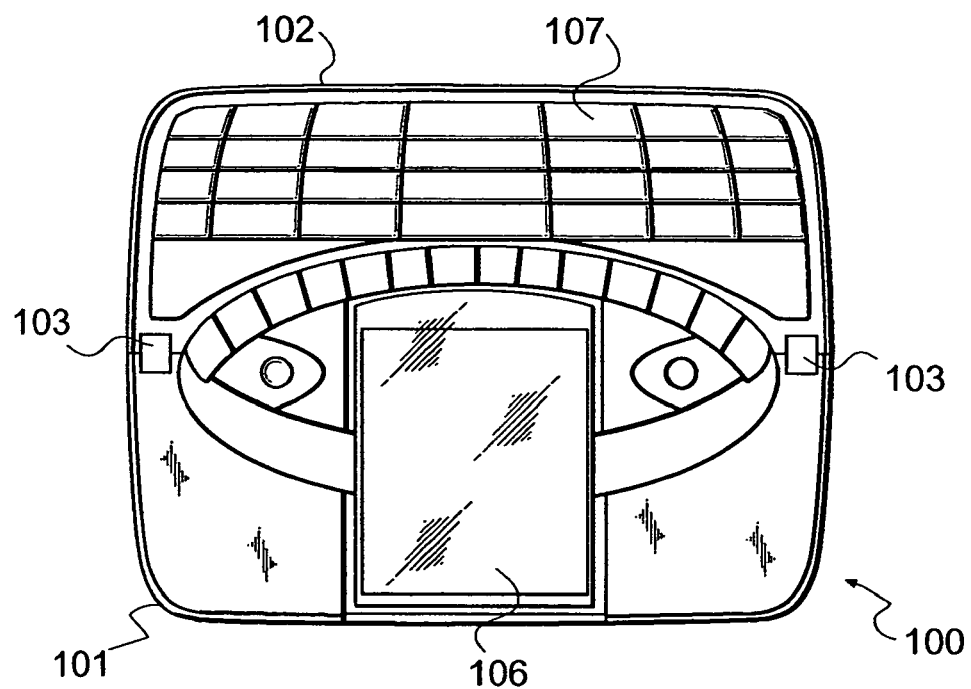
FIG. 2 depicts an example of a front view of an electronic device where a covering lid is in an opened position in accordance with some embodiments of the invention.

FIG. 2 depicts an example of a front view of the electronic device (100) where the covering lid (102) is in an opened position in accordance with some embodiments of the invention. The body (101) of the electronic device (100) is depicted in FIG. 2. The covering lid (102) is opened. The hinge (103) is visible. The covering lid (102) comprises a qwerty keypad (107) or the like. The keypad (107) enables easy and relatively effective typing. The keypad (107) or the like can refer to the keyboard in the slightly smaller scale. When the lid (102) is open, the keypad (107) is available for typing. Also the entire display (106) is visible. Furthermore, the certain keys (105) are also visible. The embodiment of FIG. 2 enables easy and relatively fast typing and messaging with the electronic device because, for example, the entire display (106) and the qwerty keypad (107) is available. Furthermore, the positioning of the keypad (107) and the display (106) is beneficial for holding and typing with the phone (100). The keypad (107) is placed on top of the display (106) as shown in FIG. 2. The keypad (107) is positioned above the display (106). The front view of FIG. 2 has some advantageous features visibly available for, for example, messaging by the electronic device (100). In the front view of mobile the lid (102) and the body (101) are shown in a generally planar view.

Figures 3A, 3B:
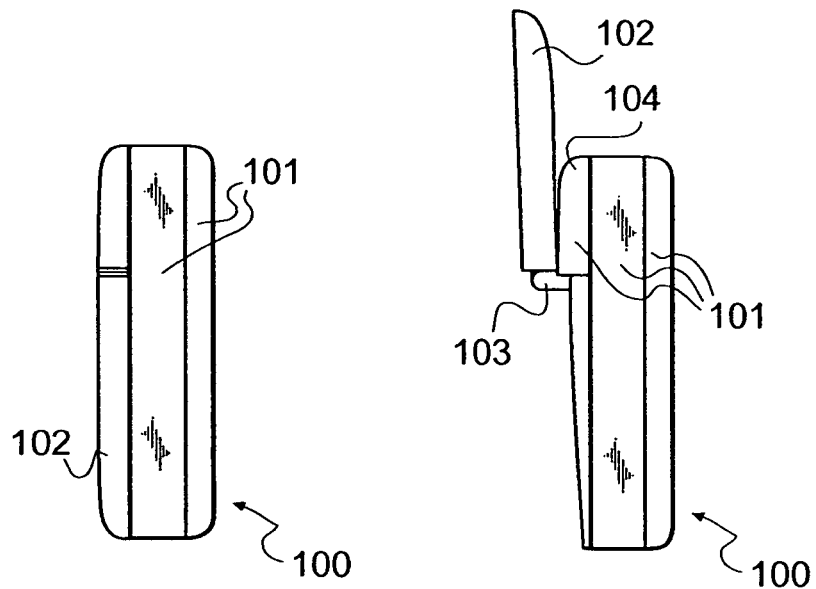
FIG. 3a depicts an example of a side view of an electronic device where a covering lid is in a closed position in accordance with some embodiments of the invention.
FIG. 3b depicts an example of a side view of an electronic device where a covering lid is in opened position in accordance with some embodiments of the invention.

FIG. 3a depicts an example of a side view of the electronic device (100) where the covering lid (102) is in the closed position in accordance with some embodiments of the invention. The lid (102) forms or establishes a mechanically integral part of the electronic device (100) along with the body (101) and the portion (104) of the body appearing on the same side as the lid (102). The portion (104) of the body and the lid (102) form or together establish a generally planar front side or view of the electronic device (100). The hinge (103) is substantially invisible hid by the covering lid (102). The hinge (103) is retreated by a spring force, which partly mounts the hinge to the body (101). Furthermore the hinge (103) can also be retracted by the closing of the lid (102). The mechanical design and structure of the electronic device (100) can be compact and smooth, thereby enabling convenient holding of the phone, for example, in the pocket of the user.

FIG. 3b depicts an example of a side view of the electronic device (100) where the covering lid (102) is in an opened position in accordance with some embodiments of the invention. The covering lid (102) rotates, thereby ascending/sliding upon the portion (104) of the front side. The hinge (103) is visible. The hinge (103) mounting to the body (101) is elastic, e.g. by the spring, thereby allowing the lid (102) and the hinge pivot to rotate and slide/ascend. The side view of the electronic device (100) shows that the lid (102) and the body of the front side are parallel but are situated at a different level. The lid (102) is situated slightly higher than the front side of the body (101). Easy and comfortable handling of the keypad (107) of the lid (102) by the thumb(s) is thus achieved. The palm of the hand and also other fingers can hold and/or grip the body (101) and thumb(s) is(are) free for typing.

Figures 4A, 4B:
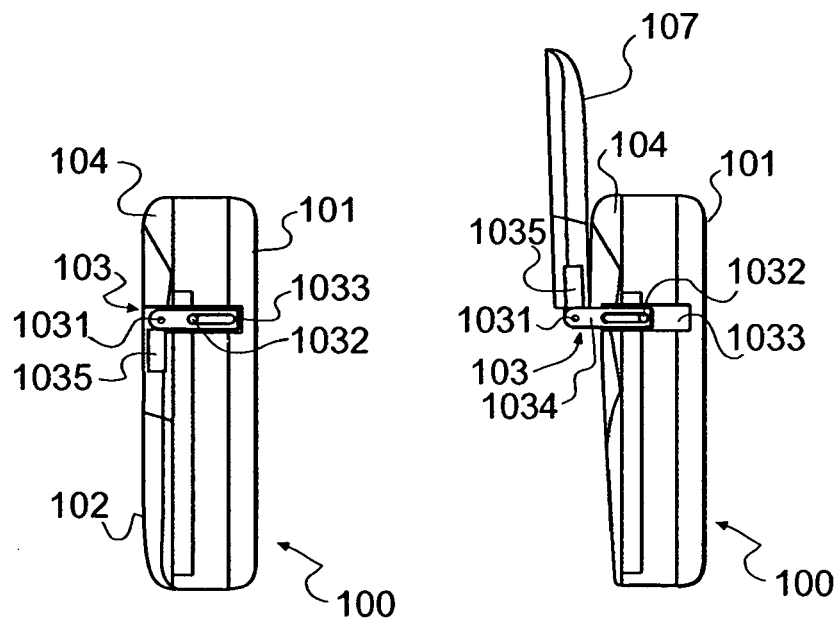
FIG. 4a depicts an example of a side section view of an electronic device showing a hinge construction where a covering lid is in a closed position in accordance with some embodiments of the invention.
FIG. 4b depicts an example of a side section view of an electronic device showing a hinge construction where a covering lid is in opened position in accordance with some embodiments of the invention.

FIG. 4a depicts an example of a side section view of an electronic device (100) showing a hinge construction (103) where a covering lid (102) is in a closed position in accordance with some embodiments of the invention. The hinge (103) comprises a hinge pivot (1031). The hinge (103) comprises also a plug (1032) which limits the slide of the hinge construction (103) along with a second hinge part (1034). The second hinge part (1034) has an elongated aperture adapted to fit the plug (1032) in such a way that the second hinge part (1034) (and thereby the lid (102)) can slide with respect of the plug (1032). In the example of FIG. 4a the plug (1032) and the second hinge part (1034) are in the closed position. The hinge construction (103) comprises also an elongated nest (1033) in the body (101) to accommodate the resilient means (not shown), the second hinge part (1034) and the plug (1032). Thus the hinge construction (103) has also the resilient means for resiliently mounting the second hinge part (1034), the hinge pivot (1031) and a first hinge part (1035) to the body (101). The resilient means can be, for example, a spring, elastic material having resilient properties, rubber, etc. The first hinge part (1035) attaches the hinge construction (103) to the covering lid (102).

FIG. 4b depicts an example of a side section view of an electronic device (100) showing a hinge construction (103) where a covering lid (102) is in opened position in accordance with some embodiments of the invention. In the open position, the covering lid (102) is upon the portion (104) of the electronic device (100). The hinge construction (103) has slid to the upmost position. The first hinge part (1035), the hinge pivot (1031) and the second hinge part (1034) are slid to the upmost position. The plug (1032) attaches and prevents the hinge construction (103) to be released from the body (101). The resilient means is stretched and slid. Thereby there is also a resilient force dragging the hinge construction (103) towards the body (101). The resilient force is stronger than in the example of FIG. 4a. The aperture (1033) is enlarged in the FIG. 4b because the hinge construction (103) is dragged by opening the lid (102). It should be noted that although there is the resilient force pulling the hinge construction (103) to retreat, thereby closing the lid (102), the lid (102) can be adapted to maintain the open position, for example by a locking mechanism or stiffness/friction in the hinge pivot. The friction can be adapted for certain angles only thereby maintaining the lid (102) open, and when the angle is passed allowing the resilient force to close the lid (102).

Figure 5:
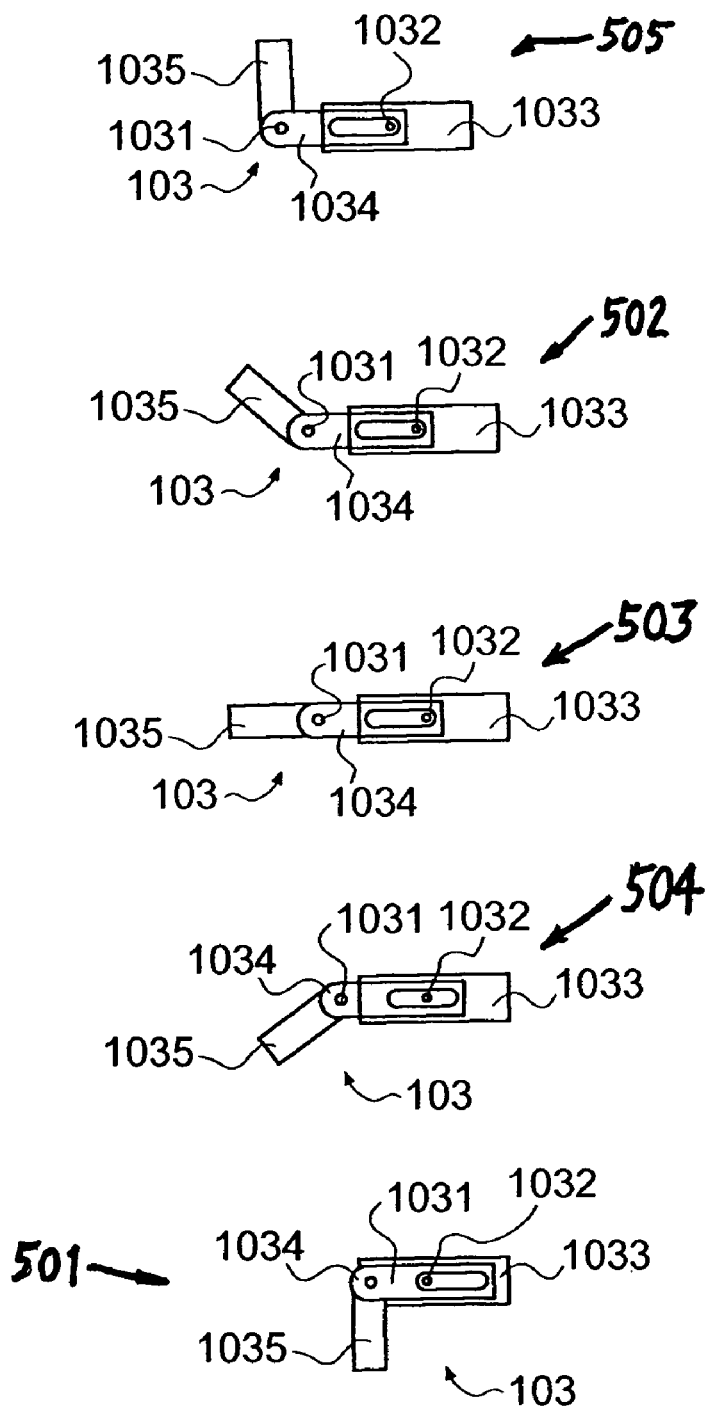
FIG. 5 depicts examples of hinge movements in accordance with some embodiments of the invention.

FIG. 5 depicts examples of the hinge (103) movements in accordance with some embodiments of the invention. In the position (501) the covering lid (102) is in the closed position. The resilient force such as the spring drags the parts of the hinge construction (103) towards the body. Thereby the covering lid (102) can be integrated into the front side of the electronic device (100). The first part of the hinge (1034) and the second part of the hinge (1035) are transversal or in some cases perpendicular to each other. In the positions (502, 503, 504) the covering lid (102) is either being opened or closed. The first and the second hinge parts (1034, 1035) and the hinge pivot (1031) can slide because the user of the device drags or pulls the covering lid (102). Furthermore, the first and the second hinge parts (1034, 1035) and the hinge pivot (1031) can slide and ascend because the covering lid (102) is rotatably opened. Thus when the covering lid (102) is rotatably opened, it coincides with the portion of the body (104). As the rotating continues and the lid (102) coincides with the portion (104) the hinge construction (103) slides to allow the rotating continue until the covering lid (102) is in the open position, for example parallel to the front side. When the covering lid (102) is being closed, respectively the positions (502, 503, 504), the force of the spring drags the hinge construction (103) and the covering lid (102) towards the body (101) thereby generally integrating the lid (102) to the body (101). The user can initiate the closing by rotating the lid (102) backwards. Furthermore, the user can push to hinge construction (103) and the lid (102) towards the body (101). However, this is not necessary because the spring force can pull the hinge construction (103) inside the body (101). The position (505) illustrates the hinge construction (103) in the opened position when the covering lid (102) is opened. Also the first part of the hinge (1034) and the second part of the hinge (1035) are transversal or in some cases perpendicular to each other in the opened position.

Figure 6:
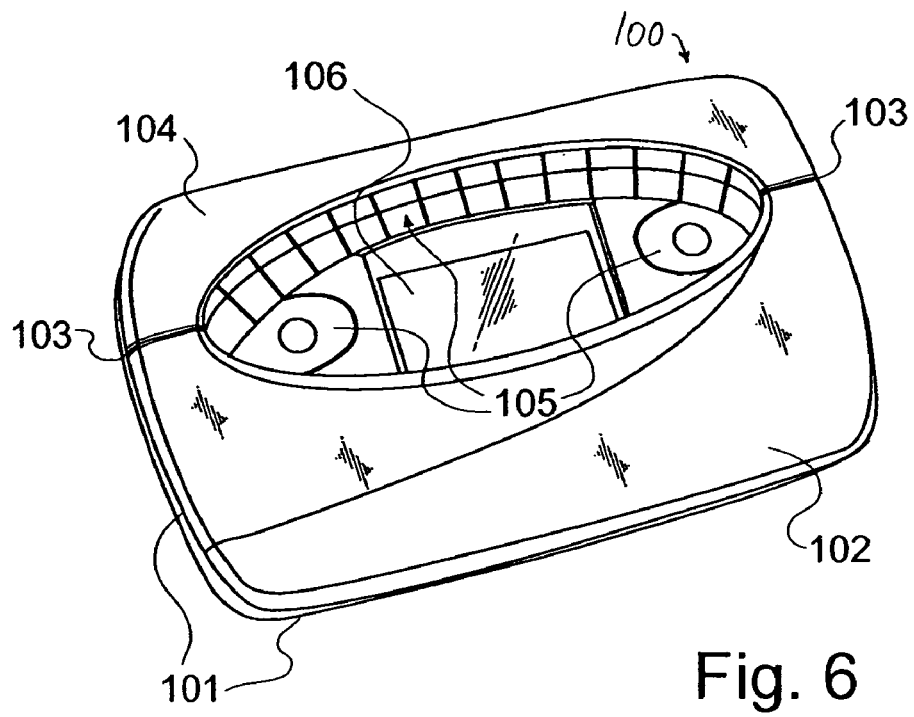
FIG. 6 depicts an example of an electronic device where a covering lid is in a closed position in accordance with some embodiments of the invention.

FIG. 6 depicts an example of an electronic device (100) where a covering lid (102) is in a closed position in accordance with some embodiments of the invention.

Figure 7:
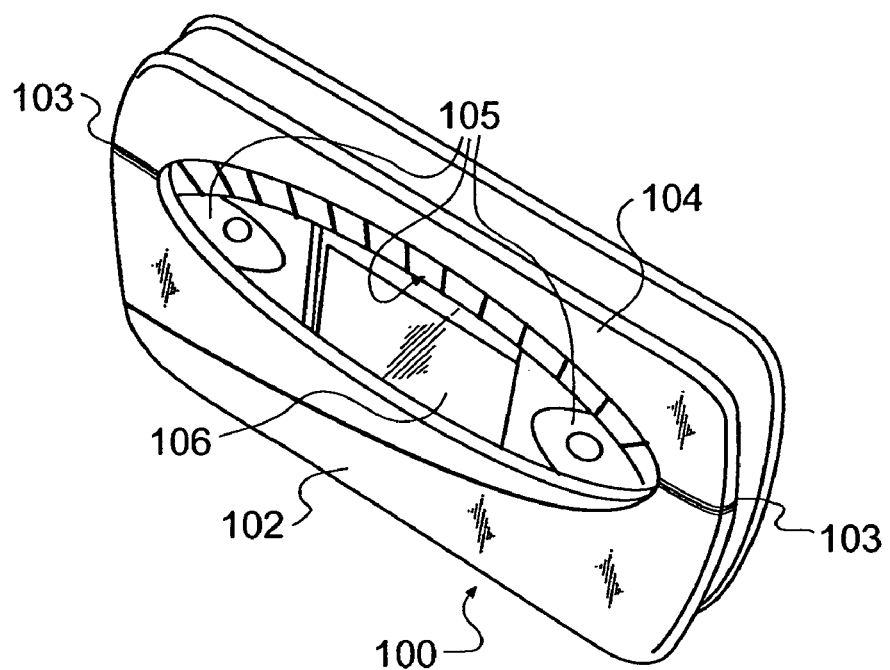
FIG. 7 depicts another example of an electronic device where a covering lid is in a closed position in accordance with some embodiments of the invention.

FIG. 7 depicts another example of an electronic device (100) where a covering lid (102) is in a closed position in accordance with some embodiments of the invention.

Figure 8A:
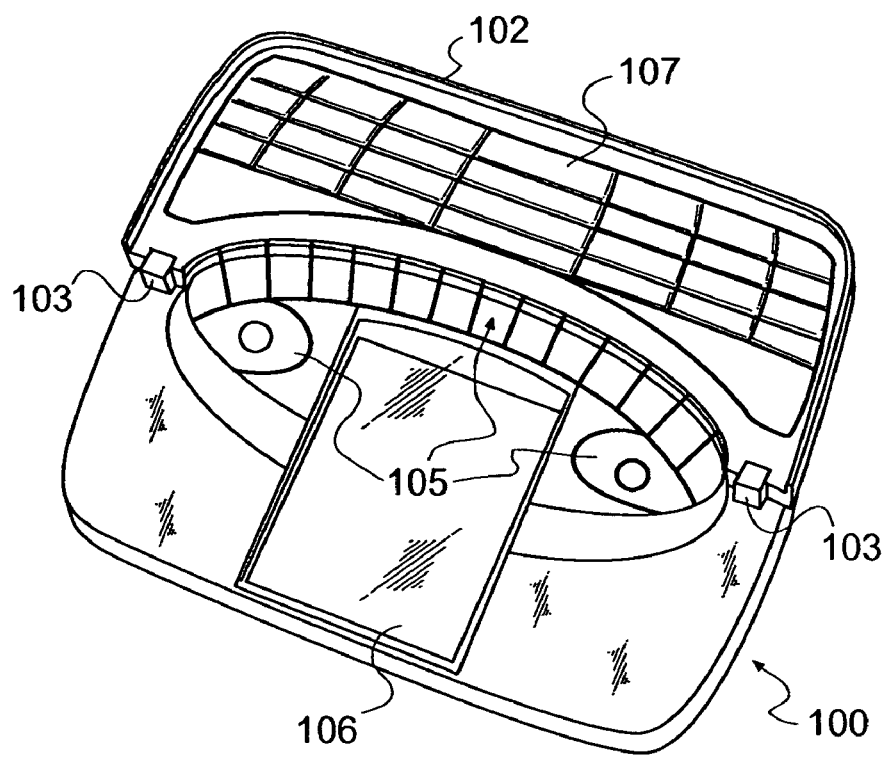
FIG. 8a depicts an example of an electronic device where a covering lid is in opened position in accordance with some embodiments of the invention.

FIG. 8a depicts an example of an electronic device (100) where a covering lid (102) is in opened position in accordance with an embodiment of the invention.

Figure 8B:
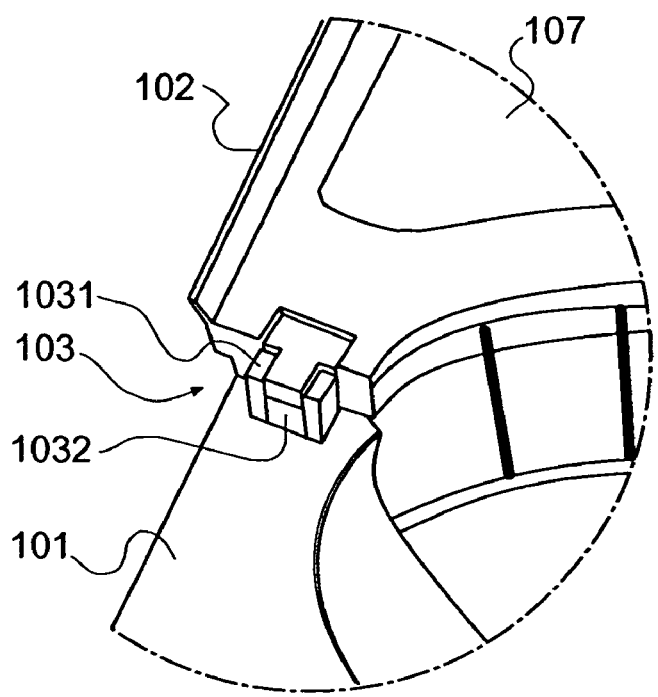
FIG. 8b depicts an example of zoomed details of a hinge construction in accordance with some embodiments of the invention.

FIG. 8b depicts an example of zoomed details of a hinge construction (103) in accordance with some embodiments of the invention.

Ramifications and Scope

Although the description above contains many specifics, these are merely provided to illustrate the invention and should not be construed as limitations of the invention's scope. Thus it will be apparent to those skilled in the art that various modifications and variations can be made in the arrangements and processes of the present invention without departing from the spirit or scope of the invention.

The invention claimed is:

1. An electronic device comprising a body, at least partly covering lid rotatably mounted to the body by a hinge, wherein
the hinge is adapted to be slideably mounted to the body such that the lid is rotatable to an open position, in which open position the lid comprises a key-pad of the electronic device positioned in a front side of the electronic device above a display of the electronic device, and further
the hinge is resiliently mounted to the body such that the lid is rotatable to a closed position, in which closed position the hinge is adapted to retreat to be generally invisible by the covering lid.

2. An electronic device according to claim 1, in which open position the lid is further adapted to rotate upon a portion of the body establishing the front side, and in which open position the lid is adapted to be in a generally parallel position in respect of the front side.

3. An electronic device according to claim 1, in which closed position the lid is further adapted to be generally visually integrated to the front side by the resilient force of the hinge mounting, thereby substantially hiding the hinge.

4. An electronic device according to claim 2, in which closed position the lid is further adapted to be generally visually integrated to the front side by the resilient force of the hinge mounting, thereby substantially hiding the hinge.

5. An electronic device according to claim 1, wherein the hinge mounting comprises a spring.

6. An electronic device according to claim 1, wherein the hinge is adapted for multi-dimensional movement.

7. An electronic device according to claim 6, wherein the multi-dimensional movement comprises double movement.

8. An electronic device according to claim 7, wherein the hinge movement comprises rotation of 180 degrees and sliding.

9. An electronic device according to claim 1, wherein the hinge mounting comprises a telescopic construction.

10. An electronic device according to claim 1, wherein the hinge comprises a hinge pivot, a first part for attaching the hinge to the covering lid, a second part containing an elongated aperture for accommodating a plug for attaching the second part to the body thereby allowing the hinge to slide, and resilient means thereby allowing the hinge to resiliently slide, wherein the body further comprises an elongated nest having the plug and the resilient means thereby allowing the hinge to retreat therein.

11. An electronic device according to claim 1, wherein, in the closed position, the electronic device is adapted to operate as a voice communication device.

12. An electronic device according to claim 11, wherein the electronic device comprises as visible objects at least the following: a small indicator display and keys for dialling.

13. An electronic device according to claim 12, wherein the small indicator display comprises a part of entire display of the electronic device in such a way that the covering lid delimits the part from the entire display.

14. An electronic device according to claim 1, wherein, in the opened position, the keypad comprises a qwerty keypad.

15. An electronic device according to claim 1, wherein, in the opened position, the covering lid is positioned at a higher plane level in respect of a front side.

16. A hinge construction for an electronic device comprising: a body, at least partly covering lid rotatably mounted to the body by a hinge pivot, wherein
the hinge construction is adapted to be slideably mounted to the body such that the lid is rotatable to an open position, in which open position the lid comprises a keypad of the electronic device positioned in a front side of the electronic device above a display of the electronic device, and further
the hinge construction is resiliently mounted to the body such that the lid is rotatable to a closed position, in which closed position the hinge construction is adapted to retreat to be generally invisible by the covering lid.

17. A hinge construction for an electronic device according to claim 16, in which open position the lid is further adapted to rotate upon a portion of the body establishing the front side, and in which open position the lid is adapted to be in a generally parallel position in respect of the front side.

18. A hinge construction for an electronic device according to claim 16, in which closed position the lid is further adapted to be generally visually integrated to the front side by the resilient force of the hinge mounting, thereby substantially hiding the hinge.

19. A hinge construction for electronic device according to claim 17, in which closed position the lid is further adapted to be generally visually integrated to the front side by the resilient force of the hinge mounting, thereby substantially hiding the hinge.

20. A hinge construction for electronic device according to claim 16, wherein the hinge mounting comprises a spring.

21. A hinge construction for electronic device according to claim 16, wherein the hinge is adapted for multi-dimensional movements.

22. A hinge construction for electronic device according to claim 21, wherein the multi-dimensional movements comprises a double movement.

23. A hinge construction for electronic device according to claim 22, wherein the hinge movement comprises rotation of 180 degrees and sliding.

24. An electronic device according to claim 16, wherein the hinge mounting comprises a telescopic construction.

25. An electronic device according to claim 1, wherein the hinge comprises a hinge pivot, a first part for attaching the hinge to the covering lid, a second part containing an elongated aperture for accommodating a plug for attaching the second part to the body and thereby allowing the hinge to slide, and resilient means thereby allowing the hinge to resiliently slide, wherein the body further comprises an elongated nest having the plug and the resilient means thereby allowing the hinge to retreat therein.

26. A hinge construction for electronic device according to claim 16, wherein, in the closed position, the electronic device is adapted to operate as a voice communication device.

27. A hinge construction for electronic device according to claim 26, wherein the electronic device comprises as visible objects at least the following a small indicator display and keys for dialling.

28. A hinge construction for electronic device according to claim 27, wherein the small indicator display comprises a part of entire display of the electronic device in such a way that the covering lid delimits the part from the entire display.

29. A hinge construction for electronic device according to claim 16, wherein, in the opened position, the keypad comprises a qwerty keypad.

30. A hinge construction for electronic device according to claim 16, wherein, in the opened position, the covering lid is positioned at a higher plane level in respect of a front side.

31. A method for switching a functional mode of an electronic device, the method comprising the steps of:
triggering a messaging mode of the electronic device by opening a covering lid of the electronic device in such a way that a keypad for typing, which is contained in the covering lid, is positioned above a display of the electronic device, and
triggering a voice communication mode of the electronic device by closing the covering lid in such a way a slidable hinge construction, which pivots the covering lid to the electronic device, is invisible, wherein
triggering respective modes terminates the current mode.

* * * * *